United States Patent [19]

Gassmann

[11] 4,069,713
[45] Jan. 24, 1978

[54] ARRANGEMENT FOR DETERMINING LIQUID AND GAS FLOW RATES

[75] Inventor: Gerhard G. Gassmann, Esslingen-Berkheim, Germany

[73] Assignee: International Telephone and Telegraph Industries, New York, N.Y.

[21] Appl. No.: 677,052

[22] Filed: Apr. 14, 1976

[30] Foreign Application Priority Data

Apr. 18, 1975   Germany ............................ 2517117

[51] Int. Cl.² .............................................. G01F 1/66
[52] U.S. Cl. ................................................. 73/194 A
[58] Field of Search ..................................... 73/194 A

[56] References Cited

U.S. PATENT DOCUMENTS

| 2,826,912 | 3/1958 | Kritz ................................... 73/194 A |
| 2,865,196 | 12/1958 | Bordenave et al. ........... 73/194 A X |
| 3,720,105 | 3/1973 | Cirulis ................................. 73/194 A |
| 3,894,431 | 7/1975 | Muston et al. .................... 73/194 A |

Primary Examiner—Charles A. Ruehl
Attorney, Agent, or Firm—A. Donald Stolzy

[57] ABSTRACT

By means of sonic or ultrasonic energy, flow rate is determined as a linear function of the difference between two frequencies by taking measurements in the direction of flow and in the direction opposite thereto. Transducers are used alternately as generators and pickups. To this end, the transit time difference is determined by means of a phase detector, and the frequencies of two oscillators are readjusted in accordance with the results of the measurements. The difference frequency can be indicated and calibrated in flow rate, and the number of cycles can be counted, the flow volume being directly proportional thereto.

3 Claims, 7 Drawing Figures

ARRANGEMENT FOR DETERMINING LIQUID AND GAS FLOW RATES

BACKGROUND OF THE INVENTION

The present invention relates to an arrangement for determining liquid and gas flow rates on the basis of the transit-time difference obtained by two measurements performed with two sound transducers spaced the same distance apart in both measurements, but with opposite directions of sound propagation. Such arrangements are known from German Pat. No. 520,484. This arrangement has the disadvantage that variations in the distances between the radiating and receiving surfaces cause measurement errors. Also, disturbing noise may result in measurement errors.

Another known arrangement is disclosed in an article by C. R. Hastings, "LE Flowmeter — A New Device for Measuring Liquid Flow Rates," published in "Westinghouse Engineer," November 1968. Since that arrangement uses only a single fixed measuring length, and since for the measurement in the direction of flow and in the direction opposite flow, the sound transducers exchange their functions as a sound generator and a sound pickup, the error caused by distance variations in the case of two different measuring lengths is not present. That article also teaches to accommodate the sound transducers not simply inside the pipe, but also diagonally across from each other in the wall of the pipe. Thus, any adverse effects on the flow stream due to the sound transducers can be avoided. However, since the time measurements can no longer be performed simultaneously, additional circuitry is required for subtraction. In this case, the possibility of disturbances influencing the measurement result cannot be excluded.

Both the arrangement disclosed in German Pat. No. 520,484 and that disclosed in the said Hastings article are based on different methods whereby speed-of-sound variations in the medium which are caused by temperature effects, and variations in the density of the medium are eliminated. Undesired sound, however, may result in measurement errors.

Another known arrangement is disclosed in German Pat. No. 1,201,077. Since no difference method is used there, the temperature effect and variations in the density of the medium enter into the measurement result. Frequently, if not prior to each measurement, the zero must be determined anew. However, a phase detector is used to determine the transit time. The result is obtained, for example, by a cross correlation between the exciting and the received signals, this arrangement being highly insensitive to undesired sound. The output signal is a D.C. voltage change from the value 0.0 toward positive and negative values.

SUMMARY OF THE INVENTION

It would be especially desirable if, as a measure of the flow rate to be determined with such an arrangement, a frequency could be developed. If so, the flow volume could be determined by counting the frequency. Furthermore, such an arrangement should operate independently of temperature and density variations and of undesired sound.

The advantages listed above are achieved by adjusting the outputs of two oscillators in accordance with the output of a phase detector.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENTS

Figure 1:
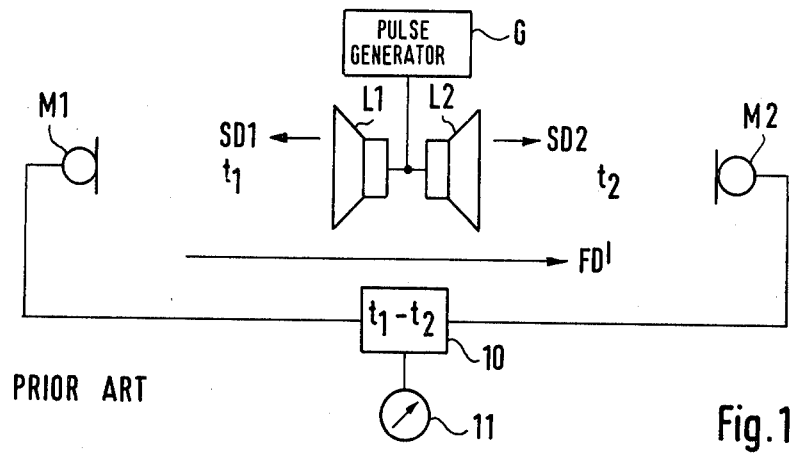
FIG. 1 is a block diagram of one prior arrangement.
Figure 2:
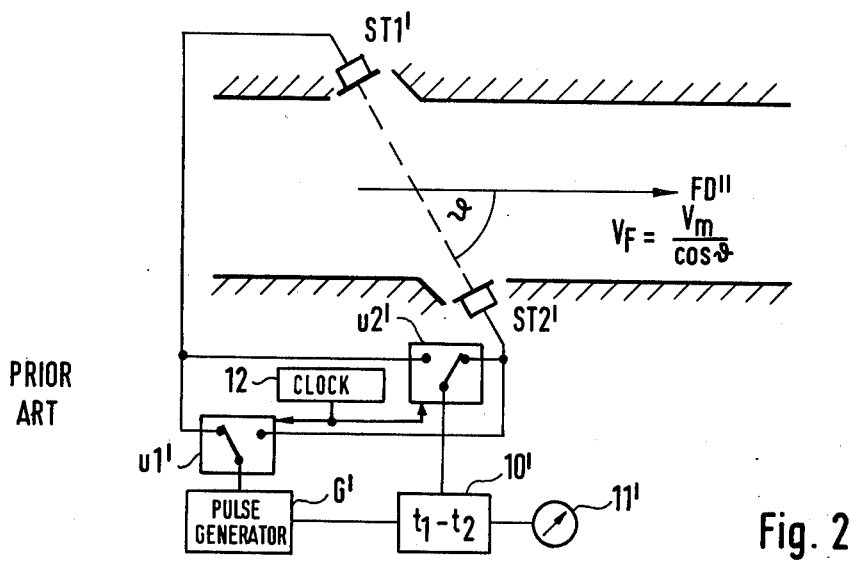
FIG. 2 is a block diagram of a second prior art arrangement.
Figure 3:
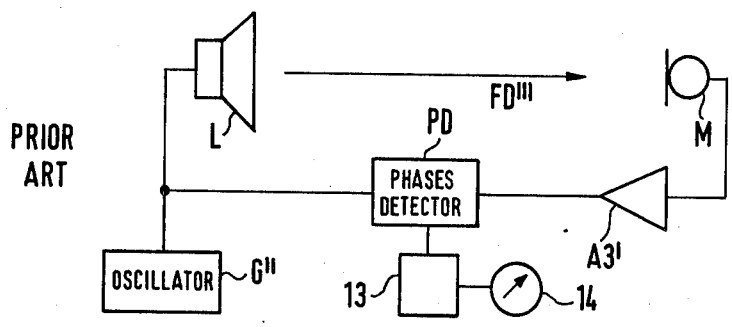
FIG. 3 is a block diagram of a third prior art arrangement.

The arrangement of German Pat. No. 520,484 is shown in FIG. 1. That of the Hastings article is shown in FIG. 2. An arrangement disclosed in German Pat. No. 1,201,077 is shown in FIG. 3.

In FIG. 1 FD' is the direction of flow of the medium. Located on both sides of a sound generator G radiating in the direction FD' and in the direction opposite thereto (SD2 and SD1, respectively) are respective transducers L2 and L1, and respective sound pickups M1 and M2. The distances between the radiating surfaces of the sound transducers L1 and L2 and the receiving surfaces of the respective sound pickups M1, M2 are equal to each other. The sound generator G transmits short sound pulses, preferably ultrasonic pulses, whose transit times $t_1$ opposite the direction of flow FD is longer than the transit time $t_2$ in the direction of flow. A conventional evaluating device 10 forms the difference $t_1 - t_2$, which is indicated by a conventional device 11. To do this, an integrating meter may be started by the pulse arriving at M2 after the time $t_2$, and stopped again on the arrival of the pulse at M1 after the time $t_1$. It is also possible, however, to charge a capacitor with, e.g. constant current during the time $t_1 - t_2$ to indicate its charge at the end of this time as a measure of flow rate.

Sound transducers ST1' and ST2' are shown in FIG. 2. Direction FD" corresponds to direction FD' in FIG. 1. The measurement of $t_1$ and $t_2$ in FIG. 2 can no longer be performed simultaneously.

Additional circuitry is therefore required for subtraction.

In FIG. 2 switches $u1'$ and $u2'$ are operated synchronously by a clock 12. Generator G' in FIG. 2 and G" in FIG. 3 may each be identical to generator G in FIG. 1, if desired. Devices 10' and 11' in FIG. 2 may, if desired, be identical to devices 10 and 11 shown in FIG. 1.

In FIG. 3, a transducer is shown at L with a sound pickup M. The symbol FD'" in FIG. 3 represents the same as symbols FD' and FD" in FIGS. 1 and 2, respectively.

A phase detector PD is shown in FIG. 3 with an amplifier A3', a low pass filter 13, and a meter 14.

Figure 4:
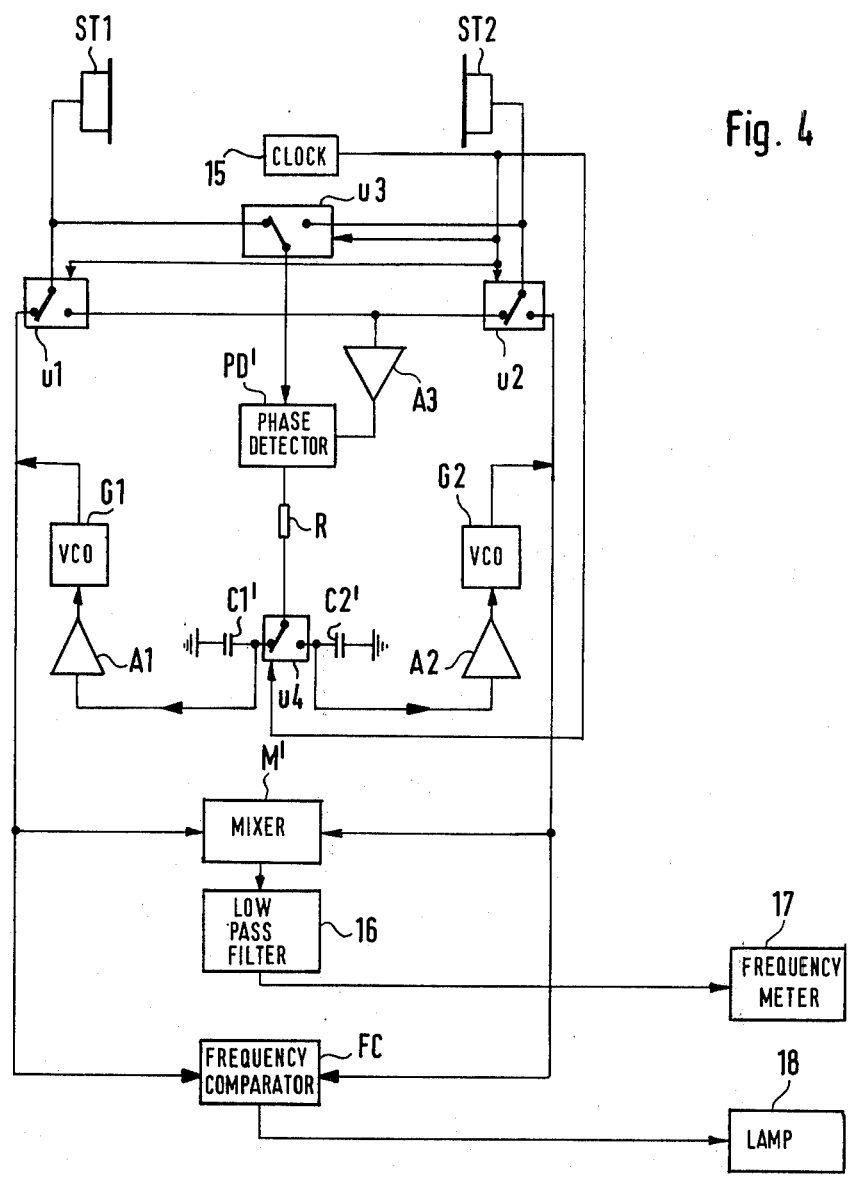
FIG. 4 is a block diagram of an arrangement constructed in accordance with the present invention.

In FIG. 4, a block diagram of an arrangement constructed in accordance with the present invention is illustrated. Two sound transducers ST1 and ST2 operate alternately as a sound generator and a sound pickup. They may be piezoelectric sound transducers, for example. Variable frequency oscillators such as voltage controlled oscillators are provided at G1 and G2, oscillators G1 and G2 being alternately connected to ST1 and ST2, respectively. Auxiliary amplifiers (not shown) may be connected between the oscillators G1 and G2 and the sound transducers ST1 and ST2 to provide electrical driving power required to generate the necessary acoustic power of the sound transducers ST1 and ST2. Switches $u1$ and $u2$ ensure that the sound transducers ST1 and ST2 are alternately connected as sound generators to the oscillators G1 and G2, respectively, or as sound pickups to the input of an amplifier A3. In the switch position shown, the sound transducer ST1 operates as a sound generator and is connected to the oscillator G1 by means of $u1$, while ST2 acts as a sound pickup and is connected to the input of the amplifier A3 by means of $u2$. A phase detector PD' (cross correlation type, if desired) serves to compare the phase of the transmitted signal with that of the received signal. One input of the detector PD' is fed with the output signal of the amplifier A3 and hence with the output signal of the respective sound transducer ST2 or ST1 used as the sound pickup. Applied to the other input through a switch $u3$ is the exciting signal of the respective sound transducer ST1 or ST2 used as the sound generator. The output voltage of the detector PD' is alternately fed to storage capacitors C1' and C2' through a resistor R and a switch $u4$. All the switches $u1$, $u2$, $u3$ and $u4$ are operated synchronously by a clock 15 in FIG. 4.

The output voltage of the detector PD is stored by capacitors C1' and C2' until the next measurement in the same direction — sound propagation in the direction of flow or in the opposite direction. Amplifiers A1 and A2 amplify the voltages on capacitors C1' and C2', respectively. The output voltage of the amplifiers A1 and A2 readjust the frequencies of the oscillators G1 and G2 in such a manner that the deviation of the output signal of the detector PD from zero becomes a minimum. The higher the control sensitivity of the control loop, i.e., the higher the gain of the two amplifiers A1 and A2, the more this will be the case. To obtain a difference frequency with a continuous slope, the time constants of the integrators comprising resistor R in the series branch and one or the other of the storage capacitors C1', C2' in the shunt branch are chosen to be large compared to one measuring period so that the controlled condition will not be established until after several periods.

With the readjustment of the frequencies of the oscillators G1 and G2, the sound wavelength λ between the two sound transducers ST1 and ST2 is kept constant in both modes — sound propagation in the same and opposite directions of the medium's flow — if the very small readjustment slip is left out of account. If desired, the input or output of amplifier A3 may be provided with a low pass filter to prevent oscillator G1 and G2 from oscillating at a harmonic of the lowest possible frequency or jumping between a harmonic and the fundamental or another harmonic. In the case of a stationary medium, the frequencies of the two oscillators G1 and G2 are equal to each other. If, however, the medium is moving, i.e., if prior to the beginning of the control action, the wavelengths of the sound signals traveling in opposite directions are different as a result of the different transit times, the control will vary the frequency of one oscillator G1 or G2 toward lower frequencies, and the frequency of the other oscillator G2 and G1 toward higher frequencies until the wavelength in one case is equal to that in the other in both of the respective directions. Thus the amount of the frequency difference between the two oscillators G1 and G2 is a measure of the flow rate, while the sign, i.e., the information on whether the frequency of G1 or that of G2 is the higher one, determines the direction of flow.

For the known difference method the following equations are valid:

$$C_1 = C_o + V;$$

$$C_2 = C_o - V;$$

$$C_1 - C_2 = 2V$$

where $C_o$ is the speed of sound in the stationary medium, $C_1$ is the speed of sound in the medium's direction of flow, $C_2$ is that in the direction opposite flow, and $V$ is the flow rate of the medium or the flow rate component in the direction of sound. It can be seen that for the determination of the flow rate, the speed of sound, which is a function of temperature and medium density, cancels out. Speed of sound, wave length, and frequency are linked by the relation $f = C/\lambda$. Substituting $C_1 = f_1 \cdot \lambda$ and $C_2 = f_2 \cdot \lambda$, into $C_1 - C_2 = 2V$ yields $C_1 - C_2 = (f_1 - F_2)\lambda = 2V$; hence, $$f_1 - f_2 = 2V/\lambda = \Delta f.$$

In the arrangement of the invention shown in FIG. 4, the frequency difference $\Delta f$ is obtained by applying the output signals $f_1$ and $f_2$ of the oscillators G1 and G2 to the inputs of a mixer M'. The difference frequency $\Delta f$ is taken from the output of the mixer M' via a low-pass filter and indicated by a frequency meter 17 calibrated in flow rate. If an indication of the direction of flow is required, it can be provided by a conventional frequency comparator FC to whose inputs are applied the oscillator frequencies $f_1$ and $f_2$, and whose output signal controls a lamp 18 to indicate whether $f_1 > f_2$ or $f_2 > f_1$.

Figure 5:
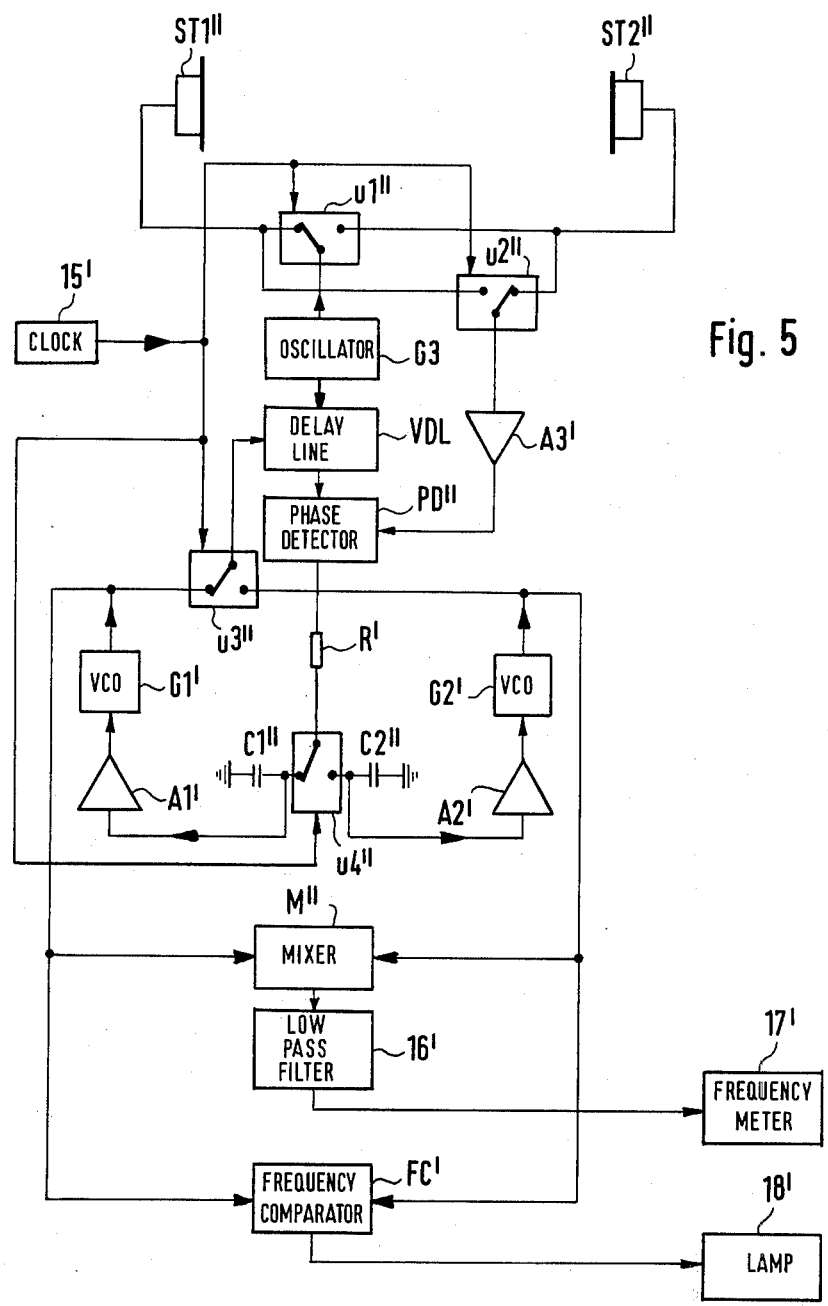
FIG. 5 is a block diagram of another arrangement of the present invention.

Another embodiment of the invention is shown in FIG. 5 including parts ST1", ST2", 15', $u1$", $u4$", PD''', G1', G2', C1", C2", R', A1', A2', A3', M''', 16', 17', FC' and 18', which may be identical to respective parts ST1, ST2 15, $u1$, $u2$, $u3$, $u4$, PD', G1, G2, C1', C2', R, A1, A2, A3, M', 16, 17, FC and 18 shown in FIG. 4. An oscillator G3 is provided which is alternately connected to transducers ST1" and ST2". An amplifier (not shown) may be provided, if desired, following the oscillator G3 and providing the electric driving power to generate the acoustic power. The switches $u1$" and $u2$" ensure that the sound transducers ST1" and ST2" are alternately connected as the sound generator from the oscillator G3 or as the sound pickup to the input of the amplifier A3'. In the switch position shown, transducer ST1" again operates as the sound generator, and transducer ST2" as the sound pickup. PD" is again the phase detector for comparing the phases of the transmitted and received signals. The output signal of the amplifier A3' is again applied to one input of the detector PD", while the output signal of the oscillator G3, i.e., the exciting signal for the respective sound generator ST1" or ST2", is applied to the other input of the detector PD" through an electrically variable delay line VDL. The output signal of the detector PD" is again fed alternately, through the resistor R' and the switch $u4$", to the storage capacitors C1" and C2", whose charging voltages are amplified by the amplifiers A1′ and A2′. The frequencies of oscillators G1′and G2′ are then adjusted in accordance with the voltage of capacitors C1″ and C2″, respectively. The electrically variable delay line VDL is alternately connected from the outputs of the oscillators G1′ and G2′ by means of switch u3″. Oscillators G1′ and G2′ are thus again readjusted so that the deviation of the output signal of the detector PD″ becomes a minimum. For the proportioning of the amplifiers and the time constants of the integrators formed with the storage capacitors, the same considerations as in the arrangement of FIG. 4 apply. The data are derived from the output signals of the oscillators G1′ and G2′ in the same manner as shown in, and as described with reference to, FIG. 4. A conventional electrically variable delay line VDL may be employed such as bucket-brigade circuits, other charge transfer devices, or purely digital delay devices.

While in the arrangement of FIG. 4 the wavelength in the medium is kept constant, i.e., the frequency changes, in the arrangement of FIG. 5 the frequency in the medium remains constant. This may be of interest if, for example, the sound transducers have a strong frequency response, or if other strong frequency dependence is to be expected.

It is unavoidable that if the direction of sound is changed, the sound transducer having operated as the sound generator needs a certain time to die out before it can operate as a sound pickup. Likewise, the new sound generator requires a certain transient response time. Also, the sound needs a certain time to travel from the sound generator to the sound pickup. All these transient and dying-out processes taking place with each reversal of the direction of sound influence the measurement result, so it is desirable to eliminate this influence. This can be done in a simple manner by not feeding the output signal of the detector PD″ to the storage capacitor C1 or C2 until after a certain time during which the arrangement has "built up," i.e., during each reversal the center contact of the switch u4″ remains in the center position for a predetermined period of time before moving on to the opposite side.

Figure 6:
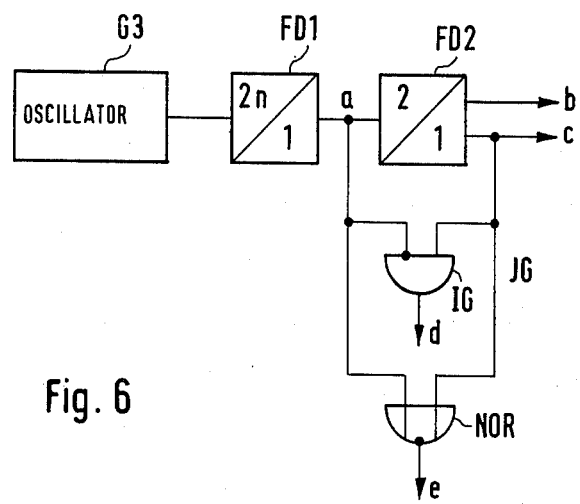
FIG. 6 is a block diagram of a third embodiment of the present invention.
Figure 7:
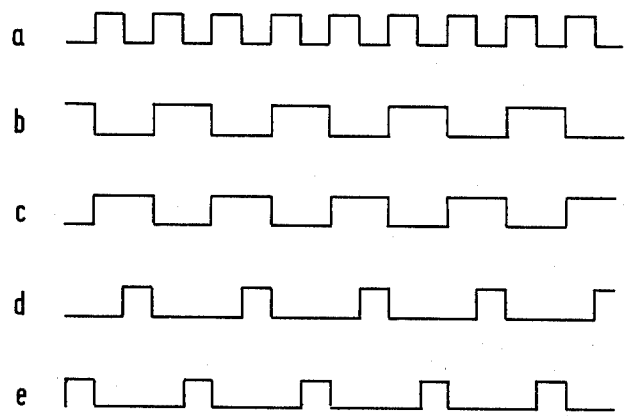
FIG. 7 is a graph of a group of waveforms characteristic of the operation of the embodiment shown in FIG. 6.

A control circuit for the arrangement of FIG. 5 is shown in FIG. 6 including a block diagram, and the waveforms at the points designated a to e in FIG. 6 are shown in FIG. 7.

In FIG. 6, as in FIG. 5, G3 is the oscillator which excites the sound transducers ST1″ and ST2″ when they are used as sound generators. Its output frequency is divided in a first frequency divider FD1 by a factor of 2n. An even division factor has been chosen so that the mark-to-space ratio at the divider's output a becomes unity. This output signal is shown in FIG. 7 at a. A second frequency divider FD2 performs another division by 2. It has two outputs b and c, which provide two out-of-phase square waves with a unity mark-to-space ratio. These two waves are shown in FIG. 7 as b and c. The signals of the output a of the first frequency divider FD1 and those of the output c of the second frequency divider FD2 are applied to the inputs of an inhibit gate IG and to the inputs of a NOR gate NOR, at whose outputs d and e appear the signal sequences shown in FIG. 7 under d and e. In FIGS. 4 and 5, the switches u are shown as electromechanical contact sets for clarity's sake. In reality, electronic switches such as transistors or field-effect transistors are employed. The potentials required to control these switches are then the pulse trains b to e. The arrangement shown in FIG. 6 is just an example. The necessary control signals can also be obtained with circuits or different design.

Finally, the processing of the two signals provided by the two oscillators G1′ and G2′ into the desired measurement result will be briefly described. In FIGS. 4 and 5, the difference frequency $\Delta f$ is formed by means of a mixer M, and an indication of the direction of flow is derived by means of a frequency comparator FC.

The following additional German patents and printed applications are cited as of interest: Nos. 520,484, 939,411, 1,094,471, 1,201,077, 1,220,160, 1,234,076, 2,429,822.

In FIGS. 4 and 5, clocks 15′ and 15 may each be described as a "constant frequency main oscillator."

What is claimed is:

1. An arrangement for determining fluid flow rates, said arrangement comprising: a pair of transducers mounted at respective upstream and downstream positions; a constant frequency main oscillator; first switch means connected from said main oscillator to said transducers to cause each of said transducers to act alternately as a sound generator and a sound pickup; a phase detector, said first switch means also always connecting the sound pickup to said phase detector; a variable delay line; first and second voltage controlled oscillators having first and second respective variable output signal frequencies; second switch means alternately connecting said first and second oscillators to said variable delay line to provide respective input signals therefrom to said phase detector to cause said first and second oscillators to be driven in a manner such that the frequencies of said first and second oscillators are driven to the point where the phases and frequencies of the input signals to said phase detector are substantially the same; and an exciting oscillator connected to alternately excite one of said transducers at a time as a sound generator, the signal received by the other sound transducer, which transducer acts as the sound pickup, being applied to one input of said phase detector as aforesaid, said phase detector having another input to which is applied said exciting oscillator output signal through said variable delay line, the output signal of said phase detector being alternately stored in one of two storage capacitors, the frequencies of said first and second oscillators alternately adjusting the delay of said delay line responsive to the charging voltages of said storage capacitors, said first and second oscillator frequencies being readjusted in such a manner that the output signal of the phase detector is reduced to a minimum.

2. An arrangement according to claim 1, wherein amplifiers are connected between said storage capacitors and the control inputs of said first and second oscillators to achieve high control sensitivity.

3. An arrangement according to claim 1, wherein a frequency comparator is provided having two inputs and an output, the output signals of said first and second oscillators each being applied to one output of said frequency comparator, said frequency comparator output being connected to a device to indicate the direction of flow.

* * * * *